United States Patent
Hensley

(10) Patent No.: US 9,265,976 B1
(45) Date of Patent: Feb. 23, 2016

(54) COMBINATION SEATBELT THREADER/AUTOMOBILE SAFETY DEVICE

(71) Applicant: Anthony Hensley, Jonesboro, AR (US)

(72) Inventor: Anthony Hensley, Jonesboro, AR (US)

( * ) Notice: Subject to any disclaimer, the term of this patent is extended or adjusted under 35 U.S.C. 154(b) by 0 days.

(21) Appl. No.: 14/468,557

(22) Filed: Aug. 26, 2014

(51) Int. Cl.
*A62B 3/00* (2006.01)
*B25F 1/00* (2006.01)
*B60S 3/04* (2006.01)
*B60R 22/32* (2006.01)

(52) U.S. Cl.
CPC . *A62B 3/00* (2013.01); *B25F 1/006* (2013.01); *B60R 22/32* (2013.01); *B60S 3/045* (2013.01)

(58) Field of Classification Search
CPC ............... B25B 9/00; B25F 1/00; B25D 1/00; B60R 22/32; A62B 3/005
USPC ......................................................... 280/733
See application file for complete search history.

(56) References Cited

U.S. PATENT DOCUMENTS

| | | | | |
|---|---|---|---|---|
| 4,028,757 A | * | 6/1977 | Young | B25D 1/04 254/26 R |
| 4,134,206 A | | 1/1979 | Beermann | |
| 4,592,467 A | * | 6/1986 | Lechner | 206/349 |
| 4,719,660 A | * | 1/1988 | Hopkins | 15/105 |
| 4,882,956 A | * | 11/1989 | Lang | B25F 1/00 81/20 |
| 5,197,176 A | | 3/1993 | Reese | |
| 5,251,351 A | * | 10/1993 | Klotz | 7/100 |
| 5,315,725 A | * | 5/1994 | Vanden Heuvel | B25D 1/00 30/123 |
| 5,496,083 A | | 3/1996 | Shouse, Jr. | |
| 5,620,231 A | | 4/1997 | Marker et al. | |
| 5,630,242 A | * | 5/1997 | Oginaezawa | 7/144 |
| 5,878,478 A | * | 3/1999 | Hasegawa | A62B 3/005 206/349 |
| 5,903,942 A | * | 5/1999 | Hasegawa | 7/144 |
| 6,003,181 A | * | 12/1999 | Wenk | 7/160 |
| 6,363,561 B1 | * | 4/2002 | Chang | B25F 1/04 7/142 |
| 6,430,797 B1 | * | 8/2002 | Dittmar et al. | 29/278 |
| 6,634,064 B2 | * | 10/2003 | Finotti | 24/198 |
| 7,093,905 B1 | | 8/2006 | George | |
| 7,210,746 B2 | | 5/2007 | Ryu | |
| 2005/0102760 A1 | * | 5/2005 | Hayhurst | B25D 1/00 7/144 |
| 2006/0251465 A1 | * | 11/2006 | Savoia et al. | 401/266 |
| 2011/0185522 A1 | * | 8/2011 | Parks | 15/111 |
| 2012/0272459 A1 | * | 11/2012 | Trice | A62B 3/005 7/144 |
| 2015/0231776 A1 | * | 8/2015 | Doster, Jr. | B25F 1/006 7/145 |

* cited by examiner

*Primary Examiner* — Ruth Ilan
*Assistant Examiner* — Darlene P Condra
(74) *Attorney, Agent, or Firm* — David J Kreher

(57) ABSTRACT

A multipurpose automobile device comprising a shaft, where attached to that shaft is a hammer means for use in breaking out the window of an automobile in an emergency, a seatbelt cutting means for cutting the seatbelt of an automobile when the seatbelt buckle cannot be released or reached, and a seatbelt threading means for threading the seatbelt of an automobile through a child safety seat. The multipurpose automobile device may also comprise an ice scraping means, a brush means, or both additional tools.

10 Claims, 4 Drawing Sheets

COMBINATION SEATBELT THREADER/AUTOMOBILE SAFETY DEVICE

AMENDED CROSS-REFERENCE TO RELATED APPLICATIONS

Not Applicable

STATEMENT REGARDING FEDERALLY SPONSORED RESEARCH OR DEVELOPMENT

Not Applicable

Figure 1:
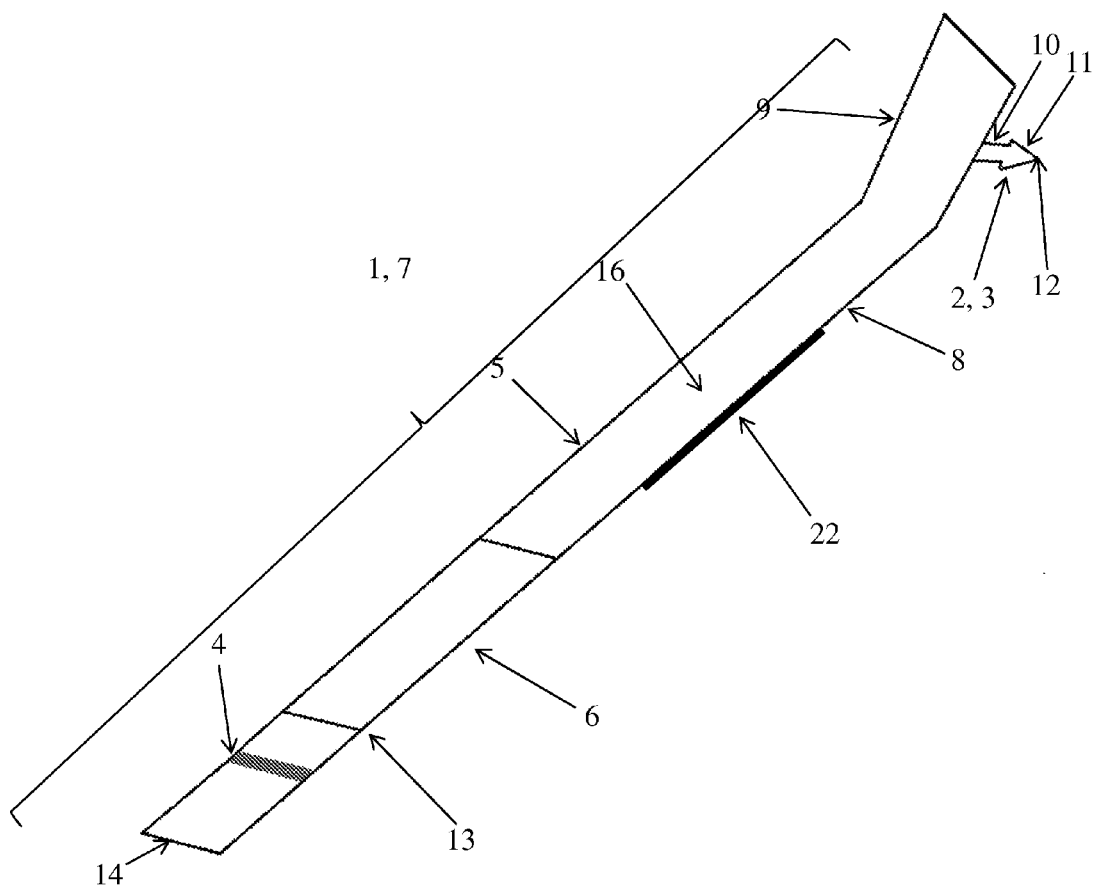

REFERENCE TO SEQUENCE LISTING, A TABLE, OR A COMPUTER PROGRAM LISTING COMPACT DISC

Not Applicable

FIELD OF THE INVENTION

The present disclosure relates to a single device that can be stored in automobiles and used for multiple applications. In particular, the combination seatbelt threader/automobile safety device is a single shaft that has attached to the shaft a hammer means for use in emergency situations where the automobile window would need to be broken out, a seatbelt cutting means for situations where the seatbelt needs to be cut because the seatbelt buckle will not release or cannot be reached, and where the hammer means also acts as a seatbelt threading means for use with a child's safety seat where the seatbelt needs to be threaded through the car seat. In a second embodiment, the combination seatbelt threader/automobile safety device may also have an ice scraping means to aid in the removal of ice from the automobile windows. There may also be an attachment means attached to the shaft to allow the combination seatbelt threader/automobile safety device to be attached to a car seat so that the device is within easy reach in the event of an emergency.

AMENDED BACKGROUND OF THE INVENTION

Prior art includes individual apparatus for a hammer means, a seatbelt cutting means, a seatbelt threading means, and ice scraping means. A hammer means and a seatbelt cutting means have been combined previously. However, the combination of a hammer means, seatbelt cutting means and seatbelt threading means have yet to be combined. Also, the combination of a hammer means, seatbelt cutting means, seatbelt threading means, and ice scraping means have yet to be combined.

Several attempts have been made to develop a combination of automobile tools.

In U.S. Pat. No. 4,134,206, Beermann discloses a cutting means for seatbelts, whereas the present disclosure reveals a cutting means, a hammer means and a seatbelt threading means for child safety seats.

In U.S. Pat. No. 4,592,467, Lechner discloses cutter means combined with a hammer means whereas the present disclosure reveals a cutting means, a hammer means and a seatbelt threading means for child safety seats.

In U.S. Pat. No. 5,197,176, Reese discloses a seatbelt treading means, whereas the resent disclosure reveals means a cutting means, a hammer means and a seatbelt threading means for child safety seats.

In U.S. Pat. No. 5,496,083, Shouse, Jr. discloses a seatbelt threading means and a system for threading the seatbelt through a child safety seat, whereas the resent disclosure reveals means a cutting means, a hammer means and a seatbelt threading means for child safety seats.

In U.S. Pat. No. 5,620,231, Marker, et al., discloses a seatbelt threading means, whereas the resent disclosure reveals means a cutting means, a hammer means and a seatbelt threading means for child safety seats.

In U.S. Pat. No. 5,630,242, Oginaezawa discloses a seatbelt cutting means combined with a hammer means, whereas the resent disclosure reveals means a cutting means, a hammer means and a seatbelt threading means for child safety seats.

In U.S. Pat. No. 5,903,942, Hasegawa discloses a seatbelt cutting means combined with a hammer means, whereas the resent disclosure reveals means a cutting means, a hammer means and a seatbelt threading means for child safety seats.

In U.S. Pat. No. 6,430,797, Dittmar, et al., discloses a seatbelt threading means for child safety seats that is rigid but somewhat flexible in two embodiments. The first embodiment involves an extended shaft with a chamber at one end. The chamber has a slot in one portion such that the buckle is inserted into the chamber and the belt portion of the seat belt goes through the slot. The handle of the seatbelt threader is then passed through the child safety seat and the seatbelt is pulled thereafter. The second embodiment involves an extended shaft with hooking means at one end. The hooking means secures to the buckle of the seatbelt and thereafter, the handle of the seatbelt threader is passed through the child safety seat and the seatbelt is pulled behind. Both embodiments can be distinguished from the present disclosure in that the present disclosure reveals means a cutting means, a hammer means and a seatbelt threading means for child safety seats and the hammer means serves a dual purpose of the seatbelt threading means.

In U.S. Pat. No. 7,093,905, George discloses a seatbelt threading means for child safety seats, whereas the resent disclosure reveals means a cutting means, a hammer means and a seatbelt threading means for child safety seats.

In U.S. Pat. No. 7,210,743, Dale discloses a seatbelt threading means for child safety seats, whereas the resent disclosure reveals means a cutting means, a hammer means and a seatbelt threading means for child safety seats.

In U.S. Pat. No. 5,251,351, Klotz discloses combination tool including an ice scraper, a squeegee, a hammer, a cutting element, a sharpening element, a container, and molded finger cutout, whereas the present disclosure reveals means a cutting means, a hammer means and a seatbelt threading means for child safety seats, as well as the possibility of an ice scrapping means and a brush means, wherein the hammer means includes a pedestal and a head, wherein the pedestal extends out from the shaft and the diameter of the pedestal is smaller than the diameter of the shaft so that, the head of the hammer means can fit through the hole of a seatbelt buckle and because the diameter of the head of the hammer means is larger than the diameter of the pedestal, the seatbelt buckle is prevented from sliding off the hammer means as the seatbelt buckle is passed through a child safety seat, thus allowing the present disclosure to also be used as a seatbelt threading means. In contrast, the Klotz patent reveals a hammer means but any portion of the Klotz hammer means that is of lesser diameter than the rest of the hammer means (See, identified item 16b) as revealed is confined within the doubled-shelled grip body of the Klotz disclosure, used to hold the hammer means within the double-shelled grip body, and as such, these annular grooves cannot be used to facilitate the attachment of a seatbelt onto the hammer means so that the hammer means can be used to facilitate the passing of a seatbelt through a child safety seat.

In U.S. Pat. No. 4,719,660, Hopkins discloses an ice scraper discloses an elongated shaft that tapers at its end to form an ice scraping means, whereas the present disclosure reveals means a cutting means, a hammer means and a seatbelt threading means for child safety seats, as well as the possibility of an ice scrapping means and a brush means.

AMENDED SUMMARY OF THE INVENTION

A combination seatbelt threader/automobile safety device comprising a shaft with a handle and several tools attached to the shaft including a hammer means for breaking an automobile window in the event of an emergency at the end of the shaft opposite the handle, a seatbelt cutting means to cut the seatbelt of an automobile in the event where the seatbelt buckle cannot be released or is unreachable located at the end of the shaft with the handle, and where the hammer means also acts as a threading means to feed a seatbelt through a child safety seat. A second embodiment comprises a hammer means at the end of the shaft opposite the handle, a seatbelt cutting means at the end of the shaft with the handle, where the hammer means also acts as a threading means, and with an ice scraping means for scraping ice of automobile windows at the end with the hammer means. The seatbelt threader/automobile safety device may also have an attachment means for attaching the seatbelt threader/automobile safety device to a car seat so that the device is within easy reach in the event of an emergency. The material with which the seatbelt threader/automobile safety device is made may be a flat and flexible or rigid. These combinations create a multipurpose device that minimizes the number of devices otherwise stored within an automobile.

AMENDED BRIEF DESCRIPTION OF THE SEVERAL VIEWS OF THE DRAWING

Figure 2:
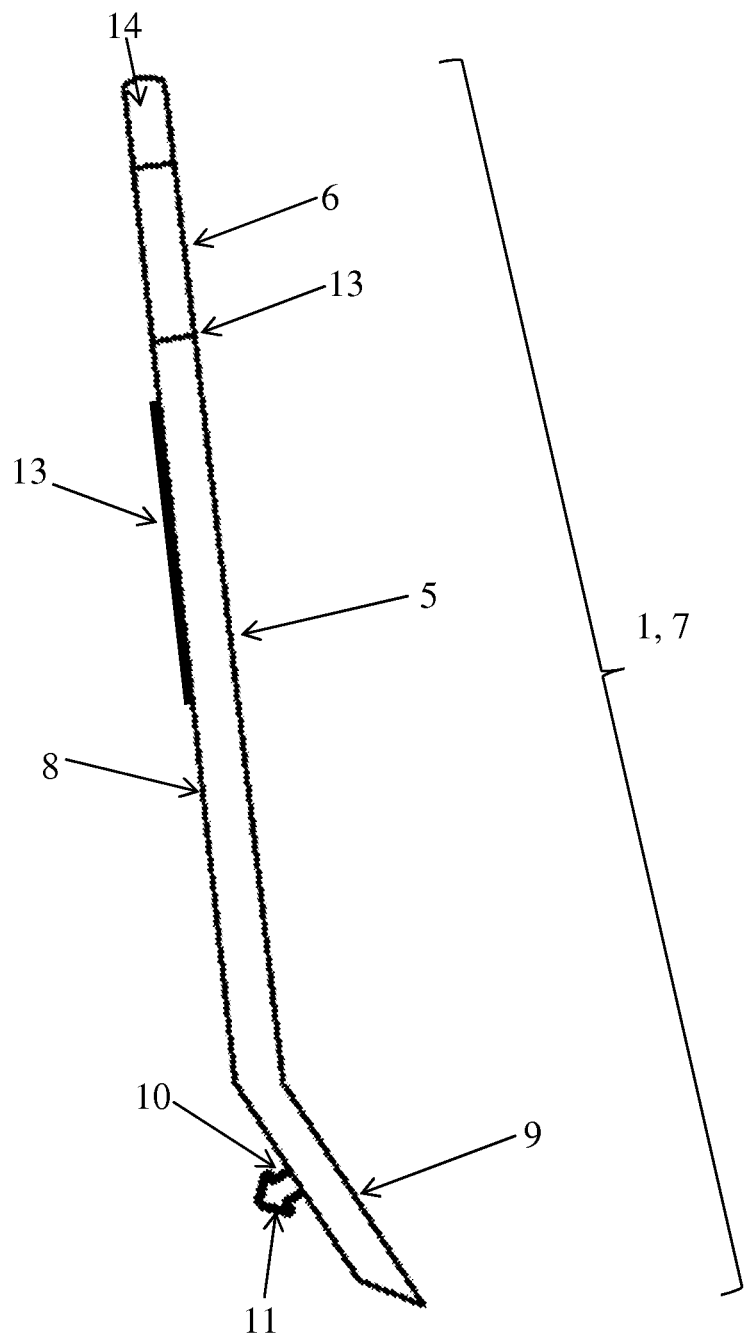
Figure 3:
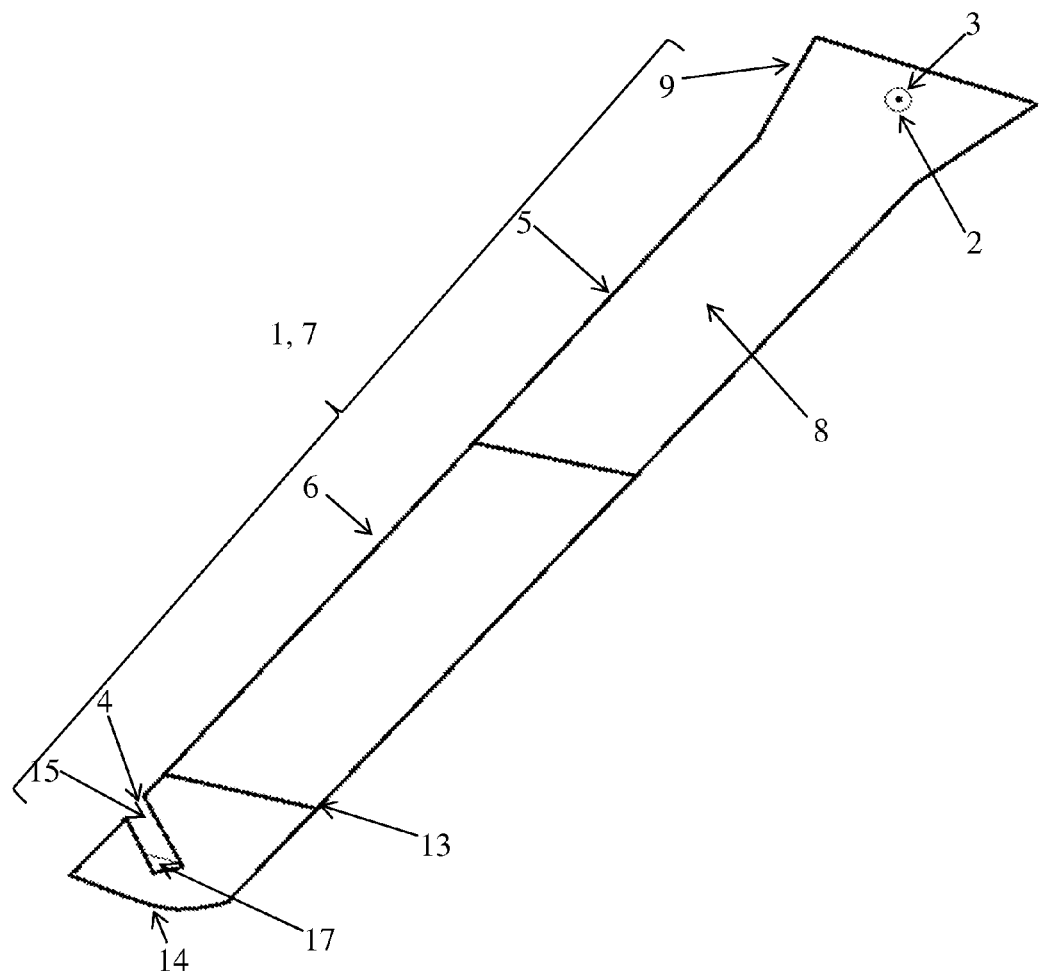
Figure 4:
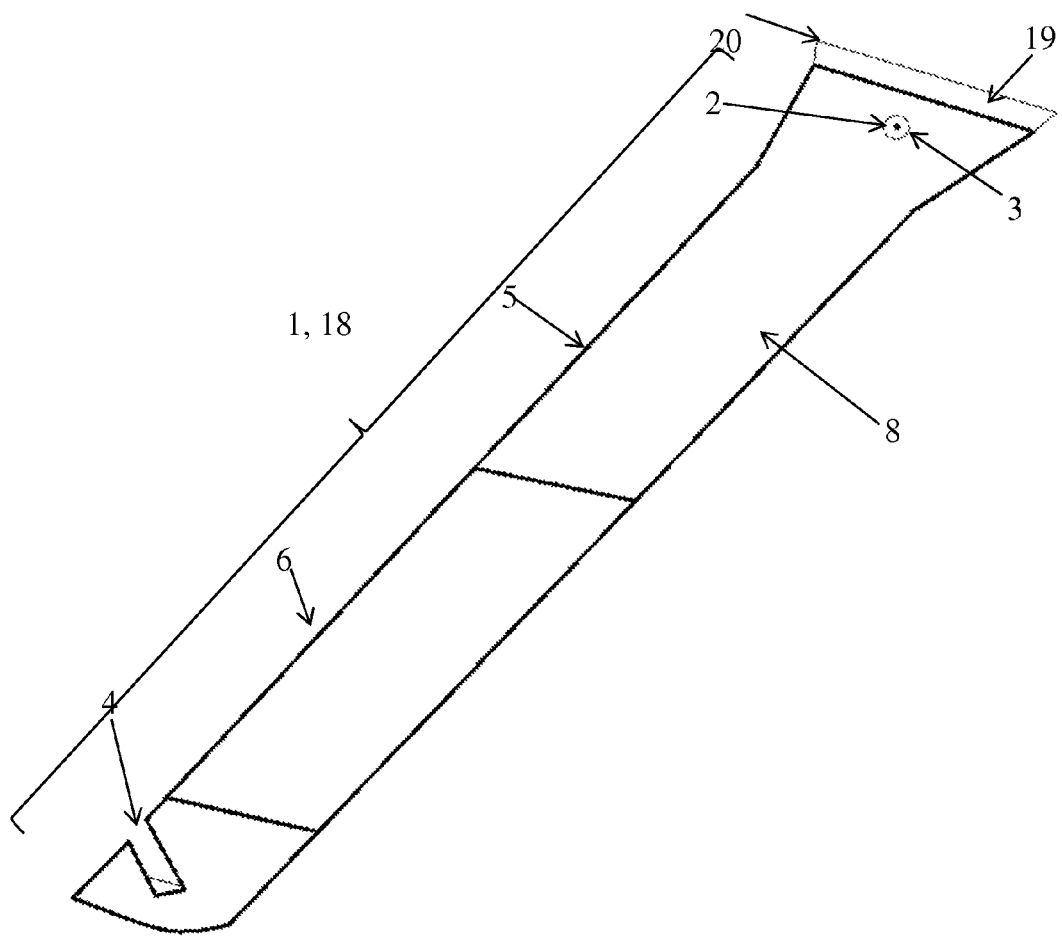

FIG. 1 is side view of the first embodiment of the combination seatbelt threader/automobile safety device comprising a hammer means, a seatbelt cutting means and a seatbelt threading means, where the hammer means, which also acts as the seatbelt threading means, is at the end of the shaft opposite the handle and the seatbelt cutting means is at the end of the shaft with the handle;

FIG. 2 is a side view of the first embodiment of the combination seatbelt threader/automobile safety device comprising a hammer means, a seatbelt cutting means and a seatbelt threading means, where the hammer means, which also acts as the seatbelt threading means, is at the end of the shaft opposite the handle and the seatbelt cutting means, which is not visible in this perspective, is at the end of the shaft with the handle;

FIG. 3 is a view of the top of the first embodiment of the combination seatbelt threader/automobile safety device comprising a hammer means, a seatbelt cutting means and a seatbelt threading means, where the hammer means, which also acts as the seatbelt threading means, is at the end of the shaft opposite the handle and the seatbelt cutting means, is at the end of the shaft with the handle; and FIG. 4 is a view of the top of the second embodiment of the combination seatbelt threader/automobile safety device comprising a hammer means, a seatbelt cutting means, a seatbelt threading means, and ice scrapping means, where the hammer means, which also acts as the seatbelt threading means, is at the end of the shaft opposite the handle, the ice scrapping means is also at the end of the shaft opposite the handle, and the seatbelt cutting means, is at the end of the shaft with the handle.

AMENDED DETAILED DESCRIPTION OF THE INVENTION

A combination seatbelt threader/automobile safety device 1 comprising a hammer means 2, which also acts as a seatbelt threading means 3 and a seatbelt cutting means 4, is positioned along a shaft 5 where the shaft 5 has a handle 6 at one end. In the first embodiment 7, the hammer means 2, which also acts as a seatbelt threading means 3, is located on the top of the shaft 8 at the end 9 of the shaft opposite the handle 6. The hammer means 2 comprises a pedestal 10 that extends out from the shaft 5 and a head 11 that rises away from the shaft 5 with a point 12 at its apex. The head 11 of the hammer means 2 is sized to fit through the hole of a seatbelt buckle. The pedestal 10 upon which the head 11 is attached has a diameter that is less than the maximum diameter of the head 11 so that when the head 11 is inserted through the hole in a seatbelt buckle, the difference in size between the head 11 and the pedestal 10 prevents the seatbelt buckle from easily sliding off the hammer means 2 so that the hammer means 2 also allows the revealed disclosure to act as a seatbelt threading means 3. The seatbelt cutting means is located at the end of the shaft with the handle 13, positioned between the handle 6 and the end of the shaft 14. The seatbelt cutting means 4 comprises a notch 15 into the side of the shaft 16, with a blade means 17 at the base of the notch 21, where the notch 15 and blade means 17 are oriented in such a manner so that when a seatbelt is inserted into the notch 15 and the user grasps and is pulling the handle 6, the orientation of the notch 15 facilitates the edge of the seatbelt to come into contact with the blade means 17 and the orientation of the blade means 17 facilitates the cutting of the seatbelt.

The second embodiment 18 of the combination seatbelt threader/automobile safety device 1 comprises a hammer means 2, which also acts as a seatbelt threading means 3, a seatbelt cutting means 4, and an ice scrapping means 19, along a shaft 5 with a handle 6 at one end. Where the hammer means 2, which also acts as a seatbelt threading means 3, is located on the top of the shaft 8 at the end 9 of the shaft opposite the handle 6. The hammer means 2 comprises a pedestal 10 that extends out from the shaft 5 and a head 11 that rises away from the shaft 5 with a point 12 at its apex. The head 11 of the hammer means 2 is sized to fit through the hole of a seatbelt buckle. The pedestal 10 upon which the head 11 is attached has a diameter that is less than the maximum diameter of the head 11 so that when the head 11 is inserted through the hole in a seatbelt buckle, the difference is size between the head 11 and the pedestal 10 prevents the seatbelt buckle from easily sliding off the hammer means 2 so that the hammer means 2 also allows the revealed disclosure to act as a seatbelt threading means 3. The seatbelt cutting means is located at the end of the shaft with the handle 13, positioned between the handle 6 and the end of the shaft 14. The seatbelt cutting means 4 comprises a notch 15 into the side of the shaft 16, with a blade means 17 at the base of the notch 21, where the notch 15 and blade means 17 are oriented in such a manner so that when a seatbelt is inserted into the notch 15 and the user grasps and pulls the handle 6, the orientation of the notch 15 facilitates the edge of the seatbelt coming into contact with the blade means 17 and the orientation of the blade means 17 facilitates the cutting of the seatbelt. There is also an ice scrapping means 19 located at the end of the shaft opposite the handle 9, between the hammer means 2 and the very end of the shaft 20.

There may also be an attachment means 22 attached to the shaft 5 to allow the combination seatbelt threader/automobile safety device 1 to be attached to a car seat so that the device is within easy reach in the event of an emergency. The material with which the seatbelt threader/automobile safety device 1 is made may be a flat and flexible or rigid.

What is claimed:

1. A combination seat belt threader/automobile safety device comprising a shaft with a handle at one end and multiple tools attached to the shaft, including a seatbelt cutter, a hammer which also acts as a seatbelt threader;
   wherein the hammer is located on the top of the shaft at the end of the shaft opposite the handle;
   wherein the hammer comprises a pedestal and a head on top of the pedestal;
   wherein the pedestal extends out from the shaft of the combination seatbelt threader/automobile safety device such that the pedestal is exposed and not within the shaft;
   wherein the diameter of the pedestal is less than the maximum diameter of the head of the hammer;
   wherein the shape of the head is such that the head reaches a point at its apex, which is opposite the pedestal upon which the head is attached;
   wherein the head of the hammer is such that a hole in a seatbelt buckle fits over the head of the hammer, and because the diameter of the pedestal of the hammer is less than the maximum diameter of the head of the hammer, the seatbelt buckle does not easily slide off of the hammer, so the hammer also acts as the seatbelt threader;
   wherein the seatbelt cutter is located on the side of the shaft at the end of the shaft with the handle, between the handle and the end of the shaft;
   wherein the shape of the seatbelt cutter is a notch into the side of the shaft;
   wherein recessed into the notch in the shaft is a blade; and
   wherein the notch and blade are oriented in such a fashion so that when a seatbelt is inserted into the notch and a user pulls on the handle, the orientation of the notch facilitates the edge of the seatbelt coming into contact with the blade and the orientation of the blade facilitates the cutting of the seatbelt.

2. The combination seatbelt threader/automobile safety device of claim 1 wherein the shaft is flat and flexible.

3. The combination seatbelt threader/automobile safety device of claim 2 wherein on the shaft there is also an attachment feature to attach the combination seatbelt threader/automobile safety device to a car seat.

4. The combination seatbelt threader/automobile safety device of claim 1 wherein the shaft is rigid.

5. The combination seatbelt threader/automobile safety device of claim 4 wherein on the shaft there is also an attachment feature to attach the combination seatbelt threader/automobile safety device to a car seat.

6. A combination seatbelt threader/automobile safety device comprising a shaft with a handle at one end and multiple tools attached to the shaft, including a seatbelt cutter, a hammer, which also acts as a seatbelt threader and an ice scraper;
   wherein the hammer is located on the top of the shaft at the end of the shaft opposite the handle;
   wherein the hammer comprises a pedestal and a head on top of the pedestal;
   wherein the pedestal extends out from the shaft of the combination seatbelt threader/automobile safety device such that the pedestal is exposed and not within the shaft;
   wherein the diameter of the pedestal is less than the maximum diameter of the head of the hammer;
   wherein the shape of the head is such that the head reaches a point at its apex, which is opposite the pedestal upon which the head is attached;
   wherein the head of the hammer is such that a hole in a seatbelt buckle fits over the head of the hammer, and because the diameter of the pedestal of the hammer is less than the maximum diameter of the head of the hammer seatbelt buckle does not easily slide off of the hammer, so the hammer also acts as the seatbelt threader;
   wherein the seatbelt cutter is located on the side of the shaft at the end of the shaft with the handle, between the handle and the end of the shaft;
   wherein the shape of the seatbelt cutter is a notch into the side of the shaft;
   wherein recessed into the notch in the shaft is a blade;
   wherein the notch and blade are oriented in such a fashion so that when a seatbelt is inserted into the notch and a user pulls on the handle, the orientation of the notch facilitates the edge of the seatbelt coming into contact with the blade and the orientation of the blade facilitates the cutting of the seatbelt; and
   wherein the end of the shaft opposite the handle is elongated, tapers and comprises the ice scraper.

7. The combination seatbelt threader/automobile safety device of claim 6 wherein the shaft is flat and flexible.

8. The combination seatbelt threader/automobile safety device of claim 7 wherein on the shaft there is also an attachment feature to attach the combination seatbelt threader/automobile safety device to a car seat.

9. The combination seatbelt threader/automobile safety device of claim 6 wherein the shaft is rigid.

10. The combination seatbelt threader/automobile safety device of claim 9 wherein on the shaft there is also an attachment feature to attach the combination seatbelt threader/automobile safety device to a car seat.

* * * * *